United States Patent
Cheng

(10) Patent No.: US 10,217,533 B2
(45) Date of Patent: Feb. 26, 2019

(54) FUEL ROD CLADDING AND METHODS FOR MAKING AND USING SAME

(71) Applicant: Bo-Ching Cheng, Cupertino, CA (US)

(72) Inventor: Bo-Ching Cheng, Cupertino, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 1065 days.

(21) Appl. No.: 14/016,008

(22) Filed: Aug. 30, 2013

(65) Prior Publication Data
US 2015/0063522 A1 Mar. 5, 2015

(51) Int. Cl.
| G21C 3/07 | (2006.01) |
| G21C 3/20 | (2006.01) |
| G21C 21/02 | (2006.01) |
| C22C 27/04 | (2006.01) |

(52) U.S. Cl.
CPC .............. G21C 3/07 (2013.01); G21C 3/20 (2013.01); C22C 27/04 (2013.01); G21C 21/02 (2013.01); Y02E 30/40 (2013.01)

(58) Field of Classification Search
CPC ... G21C 3/06; G21C 3/07; G21C 3/20; G21C 21/02
See application file for complete search history.

(56) References Cited

U.S. PATENT DOCUMENTS

| 3,031,392 A * | 4/1962 | Ida .......................... G21C 3/07 148/401 |
| 3,200,491 A * | 8/1965 | Walker .................. B23K 11/00 228/132 |
| 3,969,186 A | 7/1976 | Thompson |
| 4,045,288 A | 8/1977 | Armijo |
| 5,073,336 A * | 12/1991 | Taylor .................... C22C 16/00 376/414 |
| 5,225,154 A * | 7/1993 | Kanno ..................... G21C 3/07 376/414 |
| 5,247,550 A * | 9/1993 | Perkins .................... G21C 3/07 376/416 |
| 5,417,780 A * | 5/1995 | Adamson ................. G21C 3/20 148/421 |
| 5,790,623 A | 8/1998 | Van Swam |
| 7,232,611 B2 | 6/2007 | Hultquist |
| 2012/0087457 A1 * | 4/2012 | Garnier ................. C04B 35/565 376/416 |
| 2012/0201341 A1 * | 8/2012 | Mariani .................... B22F 3/12 376/354 |

* cited by examiner

*Primary Examiner* — Sharon M Davis
(74) *Attorney, Agent, or Firm* — Owens Law Firm, PC

(57) ABSTRACT

In general, the present invention is directed to novel nuclear fuel rod claddings that have better performance characteristics compared to current claddings, particularly during a severe accident, such as a loss of coolant accident. The present invention provides a duplex cladding having two layers, an inner Mo or Mo-alloy layer and a protective layer disposed on the outside of the Mo or Mo-alloy layer. Optionally, the Mo or Mo-alloy layer may have a coating disposed on its inner surface to provide additional capability with the fuel pellets, thereby creating a triplex cladding.

21 Claims, 1 Drawing Sheet

FUEL ROD CLADDING AND METHODS FOR MAKING AND USING SAME

BACKGROUND OF THE INVENTION

Field of the Invention

The present invention is directed to an improved fuel rod cladding for a nuclear reactor core. In particular, the present invention is directed to a fuel rod cladding comprising molybdenum and having an outer protective layer and an optional inner layer.

Description of Related Art

Current zirconium alloy (Zr-alloy) fuel cladding for light water reactor fuel rods has been optimized to achieve highly reliable performance during normal operations. However, in severe loss-of-coolant accidents, Zr-alloy cladding has certain high-temperature properties that do not favor its ability to maintain fuel rod integrity. For example, Zr-alloy cladding will undergo rapid oxidation or corrosion in high pressure steam, producing intense heat and hydrogen as the fuel cladding temperature exceeds 700-800° C. Above ~850° C., Zr-alloy cladding will suffer loss of tensile strength leading to rod burst or defamation, which can impact core coolability. Therefore, during a loss-of-coolant accident the limitations of current Zr-alloy cladding may lead to significant damage and hydrogen generation. However, neither the rapid oxidation or corrosion nor the loss of strength can be avoided by modification of the Zr-alloy cladding composition. Accordingly, there is a need for a fuel rod cladding that minimizes core damage, hydrogen generation, and dispersion of fission products in a severe accident.

BRIEF SUMMARY OF THE INVENTION

The present invention addresses the limitations of current claddings under these circumstances by providing a cladding that has sufficiently high tensile and creep strength to maintain fuel rod geometry and core coolability at temperatures that may be experienced during a loss of coolant, such as temperatures of ~1200-1500° C. Additionally, the claddings of the present invention provide relatively high resistance to oxidation in steam or steam and hydrogen mixtures, which aid in maintaining fuel rod integrity and reducing hydrogen generation. The claddings of the present invention also provide acceptable thermal neutron absorption cross sections, equivalent to that of stainless steels, for nuclear applications. Further, the claddings of the present invention can be fabricated into long, thin wall cladding tubes that can be sealed, which is desirable for a nuclear application.

In general, the nuclear fuel rod claddings of the present invention are manufactured using molybdenum (Mo) or a molybdenum alloy (Mo-alloy). Such materials provide an alternate to current light water reactor claddings for accident tolerance because of their formability as a metal and very high tensile strength at temperatures greater than 400° C. In addition, their properties allow a significant reduction of the cladding wall thickness to partially compensate for a higher neutron cross section. A thinner wall will also provide for an increase in the total fuel pellet (e.g., $UO_2$) loading by ~5-7%.

More particularly, in one embodiment, the invention is a fuel rod cladding, comprising Mo. In another embodiment, the fuel rod cladding comprises pure molybdenum. In another embodiment, the fuel rod cladding comprises a Mo-alloy.

In another embodiment, the invention is a duplex fuel rod cladding, comprising a first layer and a second layer, the first layer comprising Mo and the second layer disposed on an outer surface of the first layer. In another embodiment, the first layer of the fuel rod cladding comprises a Mo-alloy. In another embodiment, the second layer of the fuel rod cladding comprises a protective coating. In another embodiment, the second layer of the fuel rod cladding comprises a Zr-alloy or an aluminum (Al)-containing stainless steel.

In another embodiment, the invention is a triplex fuel rod cladding comprising a first layer and a second layer, the first layer comprising Mo and the second layer disposed on an outer surface of said first layer, and further comprising a third layer disposed on an inner surface of the first layer. In another embodiment the third layer is compatible with fuel pellets held by the fuel rod cladding. In another embodiment, the third layer comprises a Zr-alloy.

DETAILED DESCRIPTION OF THE INVENTION

Figure 1:
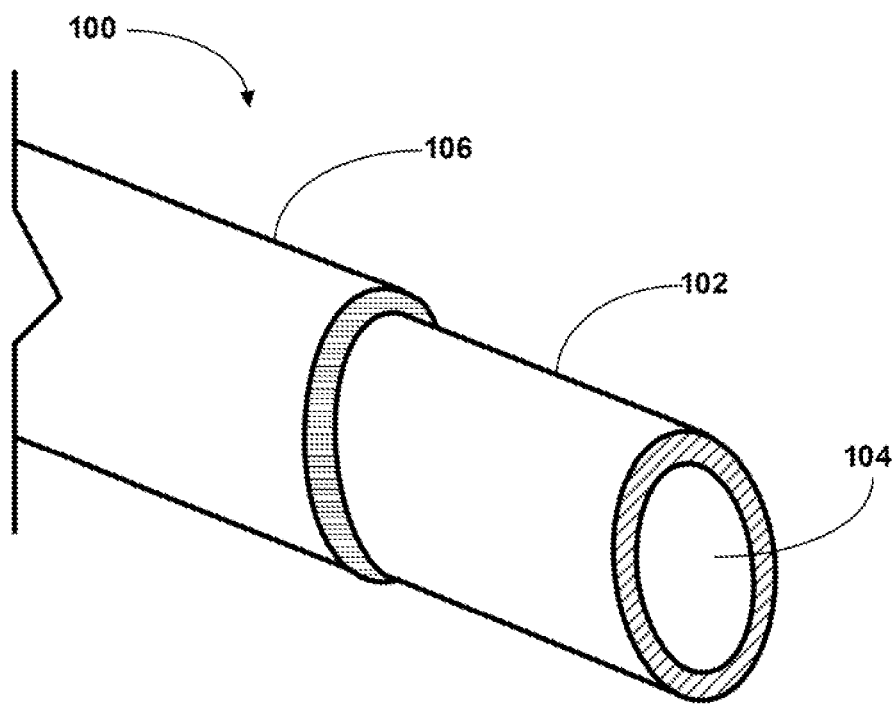
FIG. 1 illustrates a nuclear fuel rod cladding according to one embodiment of the invention.

The present invention is more fully described below with reference to the accompanying figures. While the invention will be described in conjunction with particular embodiments, it should be understood that the invention can be applied to a wide variety of applications, and it is intended to cover alternatives, modifications, and equivalents within the spirit and scope of the invention. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

In general, the present invention is directed to novel nuclear fuel rod claddings that have better performance characteristics compared to current claddings, particularly during a severe accident, such as a loss of coolant accident. During such an accident, temperatures in the nuclear reactor core may increase to over 1200° C. causing current claddings to rapidly corrode or oxidize and lose structural integrity, both of which exacerbate damage to the nuclear fuel core, resulting in hydrogen production and increased explosion risk as well as increased risk of a core meltdown.

One approach for addressing such a situation is to enhance the capability of the fuel cladding to tolerate higher temperatures that may be experienced during a loss of coolant accident. This can be accomplished by modifying or replacing current Zr-alloy cladding with a cladding that can provide such enhanced performance.

The present invention addresses the limitations of current claddings under these circumstances by providing claddings that have sufficiently high tensile and creep strength to maintain fuel rod geometry and core coolability at temperatures that may be experienced during a loss of coolant, such as temperatures of ~1200-1500° C. Additionally, the claddings of the present invention provide relatively high resistance to oxidation in steam or steam and hydrogen mixtures, which aid in maintaining fuel rod integrity and reducing hydrogen generation. The claddings of the present invention also provide an acceptable thermal neutron absorption cross section for nuclear applications that minimizes any economic penalty based on cost of the claddings. Further, the claddings of the present invention can be fabricated into long, thin wall cladding tubes that can be sealed, which is desirable for a nuclear application.

In general, the nuclear fuel rod claddings of the present invention are manufactured using molybdenum (Mo) or a molybdenum alloy (Mo-alloy). Such materials provide an alternate to current light water reactor claddings for accident tolerance because of their formability as a metal and very high tensile strength at temperatures greater than 400° C. In addition, their properties allow a significant reduction of the cladding wall thickness to partially compensate for any reduction in reactivity based upon a higher neutron cross section. A thinner wall will also provide for an increase in the total fuel pellet loading by 5-7%, which will also compensate for a reduction in reactivity.

Since Mo will react with oxygen at temperatures above 500° C. to form volatile $MO_3$, a duplex cladding may be used. In this embodiment, the outside surface of the fuel rod cladding is surrounded by a protective coating to minimize reaction of the underlying cladding with oxygen and thereby preserve the cladding's accident tolerance. In another embodiment, a triplex cladding may be used. In this embodiment, the outside surface of the fuel rod cladding is surrounded by a protective coating as in the duplex cladding embodiment, and the inside surface of the fuel rod cladding has a coating that provides enhanced capability of the cladding to the irradiated fuel pellets, such as uranium oxide fuel pellets.

Following, various embodiments and further details and aspects of the claddings are described in connection with the figures. In addition, other aspects of the invention are described, including the manufacture and use of the claddings.

FIG. 1 illustrates a nuclear fuel rod cladding according to one embodiment of the invention. Specifically, FIG. 1 illustrates a partial view of a nuclear fuel rod cladding 100. As shown, the overall cladding 100 is a cylindrical tube suitable for the receipt of nuclear fuel pellets and use in the core of a nuclear reactor. The length of the overall cladding 100 may be any length necessitated by design of the core of the reactor as known to those of skill in the art.

As shown, the overall cladding 100 is a duplex cladding in that it has two layers. An inner layer 102 is a cladding layer, which is also cylindrical in shape and has an annulus 104 that receives and holds nuclear fuel pellets. An outer layer 106 is a protective layer and is bonded to the outer surface of the inner layer 102. The outer protective layer 106 surrounds the outer surface of the inner layer 102 along all or substantially all of its length. Accordingly, the outer layer 106 is also cylindrical in shape.

The inner layer 102 is a Mo or Mo-alloy cladding. Mo is a non-hydride forming metal and has desirable mechanical properties, including desirable strength at temperatures of 300-1500° C., which includes temperatures that the cladding may be exposed to during a loss of coolant accident, compared to current Zr-alloys. For example, Mo has a significantly higher tensile and creep strength compared to Zr-alloys, particularly at higher temperatures such as 1000° C. at which Zr-alloys will rapidly lose strength. In addition, Mo has a significantly higher melting temperature and high thermal conductivity compared to Zr-alloys. Both of these properties are desirable for a nuclear fuel cladding since the cladding is exposed to high temperatures, particularly during a loss of coolant accident, and higher thermal conductivity permits higher heat transfer from the nuclear fuel pellets during operation. Mo also does not form stable metal hydrides, whereas Zr-alloy claddings do create hydrides during normal operation. Further, at temperatures experienced during a loss of coolant accident, Zr-alloy claddings react with steam to produce hydrogen, whereas Mo has shown to be much less reactive with steam. Further, Mo is abundantly available for purposes of manufacturing.

Specifically, the inner layer 102 may be constructed from pure Mo or any Mo-alloy. In some embodiments, the Mo-alloy may be an alloy of Mo and lanthanum oxide ($La_2O_3$). In some embodiments, the $Mo/La_2O_3$ alloy may comprise 0.5% or less $La_2O_3$ by weight. In some embodiments, the Mo-alloy may be an alloy of Mo and chromium (Cr) with the Mo content being 98% or more by weight or 99% or more by weight. In some embodiments, the Mo-alloy may be an alloy of Mo, Cr, and iron (Fe), with the Mo content being 98% or more by weight or 99% or more by weight. It should be appreciated that in any of the foregoing Mo-alloy compositions that other metals may be included in relatively small amounts, such as Fe and Al. For example, in some embodiments, the Mo-alloy may be an alloy of Mo with the Mo content being 98% or more by weight or 99% or more by weight with the balance being other metals such as Cr, Fe, and/or Al.

The mechanical strength provided by the Mo or Mo-alloy to the inner layer 102 allows the wall thickness of the cylindrical tube to be reduced compared to current Zr-alloy claddings. For example, Mo or Mo-alloy claddings or tubes may be made with a wall thickness of 0.25 mm or less, whereas current Zr-alloy tubes have a wall thickness of greater than 0.56 mm. In some embodiments, the wall thickness may be 0.2 mm or less. A thinner wall provides the ability to reduce the impact of Mo's neutronic adsorption on the reactivity of the fuel. In other words, by reducing the wall thickness, the volume available inside of the tube is increased and allows for the loading of ~5-7% more fuel pellets.

The outer protective layer 106 is used to protect the underlying inner Mo or Mo-alloy layer 102 during normal operation. The outer protective layer 106 is bonded to the inner layer 102 and surrounds the outer surface of the inner layer 102. In addition, because Mo is susceptible to oxidation and formation of volatile $MO_3$ when exposed to an oxidizing environment, the outer protective layer serves to minimize or reduce this oxidation during normal operation and a loss of coolant accident by prohibiting or reducing the exposure of the underlying Mo or Mo-alloy layer 102 to oxygen. The outer protective layer 106 may be made from any material that is capable of providing protection for the underlying Mo or Mo-alloy cladding layer 102 and that is compatible with the environment in which it will be used, namely a nuclear reactor core. In addition, the outer protective layer 106 must be capable of bonding to the underlying Mo or Mo-alloy cladding layer 102.

In one embodiment, the outer protective layer 106 is constructed from a Zr-alloy, which may be the same or similar to the Zr-alloy materials used in current claddings, including having similar corrosive properties. Accordingly, it should be appreciated that he use of a Zr-alloy as the outer protective layer 106 makes the overall cladding 100 compatible with existing light water reactors. Also, it should be appreciated that in some embodiments, the outer protective layer 106 may be thinner than current Zr-alloy claddings. In some embodiments, the outer protective layer 106 may be 5-20% of the thickness of current Zr-alloy claddings, and in some embodiments may be less than 0.15 mm in thickness.

It should be appreciated that during the early stages of a loss of coolant accident, the Zr-alloy protective layer 106 will be rapidly oxidized to form zirconium oxide ($ZrO_2$) at temperatures of 800-1000° C., which is expected to be stable in a high temperature steam environment and so will protect the underlying Mo or Mo-alloy layer 102. Further, because the thickness of the Zr-alloy protective layer 106 is much less than Zr-alloy claddings currently in use, the amount of hydrogen production during a loss of coolant accident will also be significantly reduced.

In another embodiment, the outer protective layer 106 is constructed from an Al-containing steel. In some embodiments, the thickness of the outer protective layer 106 of Al-containing steel may be 0.01-0.05 mm.

It should be appreciated that during a loss of coolant accident, the Al-containing steel protective layer 106 will be oxidized to form aluminum oxide ($Al_2O_3$), which is expected to similarly protect the underlying Mo or Mo-alloy layer 102. In some embodiments, the Al-containing steel protective layer 106 is expected to protect the underlying Mo or Mo-alloy layer 102 from corrosion up to temperatures of 1400° C.

Figure 2:
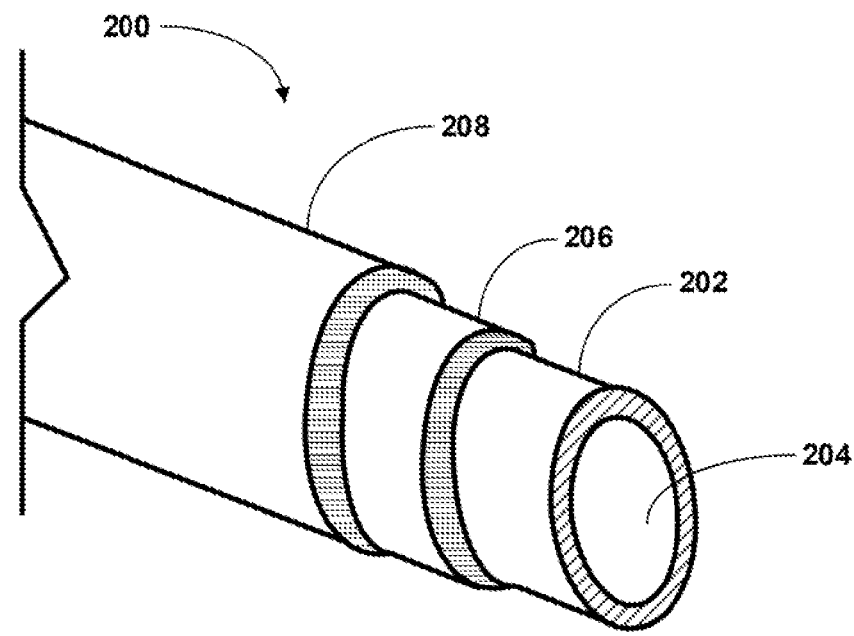
FIG. 2 illustrates a nuclear fuel rod cladding according to one embodiment of the invention.

FIG. 2 illustrates a nuclear fuel rod cladding according to one embodiment of the invention. Specifically, FIG. 2 illustrates a partial view of a nuclear fuel rod cladding 200. As shown, the overall cladding 200 is a cylindrical tube suitable for the receipt of nuclear fuel pellets and use in the core of a nuclear reactor. The length of the overall cladding 200 may be any length necessitated by design of the core of the reactor as known to those of skill in the art.

As shown, the overall cladding 200 is a triplex cladding in that it has three layers. An inner layer 202 is cylindrical in shape and has an annulus 204 that receives and holds nuclear fuel pellets. A middle layer 206 is disposed on the outer surface of the inner layer 202. An outer layer 208 is a protective layer and is bonded to the outer surface of the middle layer 206 and covers all or substantially all of the length of the inner layer 202. The outer protective layer 208 surrounds the outer surface of the middle layer 206 along substantially all of its length or its entire length. Accordingly, the outer layer 208 is also cylindrical in shape.

The middle layer 206 is the same or similar to the inner layer 102 described above in connection with FIG. 1. In other words, the middle layer 206 is a cladding layer that is constructed of Mo or Mo-alloy. It should be appreciated that the discussion above regarding the inner layer 102 applies equally to the middle layer 206 of the triplex cladding shown in FIG. 2.

Similarly, the outer layer 208 is the same or similar to the outer layer 106 described above in connection with FIG. 1. In other words, the outer layer 208 is a protective layer designed to protect the underlying Mo or Mo-alloy layer 206. Similarly, the outer layer 208 may be constructed of Zr-alloy or Al-containing steel. It should be appreciated that the discussion above regarding the outer layer 106 applies equally to the outer layer 208 of the triplex cladding shown in FIG. 2.

The inner layer 202 is a layer that is bonded to the inner surface of the Mo or Mo-alloy middle layer 206. This inner layer 202 provides compatibility with the fuel pellets that are held within the annulus 204 of the inner layer 202 by prohibiting or reducing the number of isotopes produced during operation that may attack the Mo or Mo-alloy middle layer 206. This inner layer 202 may be constructed of Zr-alloy and may be a relatively thin layer. In some embodiments, the thickness of this layer may approximately 0.075 mm. It should be appreciated that this Zr-alloy inner layer 202 is a softer material and, therefore, may reduce the potential for breakage.

The claddings described above in connection with FIGS. 1 and 2 may be made using various processes. For example, the Mo or Mo-alloy cladding or layers may be made using a low carbon arc cast process, with a doping process for creating the Mo-alloys, such as doping with lanthanum oxide to improve the ductility and high temperature tensile strength of the cladding layer, as well as the ability to fabricate the cladding. Other process that may be used include coating, mechanical co-reduction, or a hybrid of coating and mechanical reduction. The outer and inner layers that surround the Mo or Mo-alloy layer may be bonded to the Mo or Mo-alloy layer through use of a coating process, such as physical vapor deposition (PVD), inert gas and vacuum plasma spray (VPS), high velocity oxi-fuel (HVOF), and high velocity air fuel (HVAF).

In use, the claddings of the present invention are expected to provide a viable replacement for current Zr-alloy claddings in light water nuclear reactor cores and to extend the time available to address a loss of coolant accident. The Mo duplex and triplex claddings should be able to maintain the fuel rod geometry and, hence rod coolability to ~1400° C., thereby providing additional time to address the problem. In addition, based on the use of a Zr-alloy protective layer, the total possible hydrogen released in a loss of coolant accident is anticipated to be ~22% that of the current Zr-alloy cladding having a wall thickness greater than 0.6 mm. An Al-containing stainless steel protective layer can substantially reduce the oxidation rate and hence hydrogen generation rate by an order of magnitude when compared to Zr-alloy cladding.

Various embodiments of the invention have been described above. However, it should be appreciated that alternative embodiments are possible and that the invention is not limited to the specific embodiments described above. For example, various dimensions of the claddings, including various dimensions of thickness and length of the various layers of the claddings may be used. Further, additional compositions of various alloys may be used.

What is claimed is:

1. A fuel rod cladding, comprising:
    A triplex cladding having a first layer, a second layer, and a third layer disposed between said first layer and said second layer, wherein said third layer comprises molybdenum having a concentration of 98% or more by weight, and wherein said first layer is an outermost layer and said second layer is an innermost layer.

2. The fuel rod cladding of claim 1, wherein said third layer is pure molybdenum.

3. The fuel rod cladding of claim 1, wherein said third layer further comprises lanthanum oxide.

4. The fuel rod cladding of claim 1, wherein said first layer comprises a composition that upon exposure to oxygen forms an oxide layer.

5. The fuel rod cladding of claim 1, wherein said first layer comprises a zirconium alloy.

6. The fuel rod cladding of claim 1, wherein said first layer comprises an aluminum-containing stainless steel.

7. The fuel rod cladding of claim 1, wherein said second layer is compatible with fuel pellets held by the fuel rod cladding.

8. The fuel rod cladding of claim 1, wherein said second layer comprises a zirconium alloy.

9. The fuel rod cladding of claim 8, wherein said first layer comprises a zirconium alloy.

10. A fuel rod cladding, comprising:
a triplex cladding having a first layer, a second layer, and a third layer disposed between said first layer and said second layer, wherein said third layer comprises molybdenum having a concentration of 98% or more by weight; and wherein said first layer, said second layer, and said third layer comprise a cylindrical shape and form an annulus for receipt of nuclear fuel pellets, wherein said first layer is the outermost layer of said cylindrical shape and said second layer is the innermost layer of said cylindrical shape.

11. The fuel rod cladding of claim 10, wherein said third layer is pure molybdenum.

12. The fuel rod cladding of claim 10, wherein said third layer further comprises lanthanum oxide.

13. The fuel rod cladding of claim 10, wherein said first layer comprises a composition that upon exposure to oxygen forms an oxide layer.

14. The fuel rod cladding of claim 10, wherein said first layer comprises a zirconium alloy.

15. The fuel rod cladding of claim 10, wherein said first layer comprises an aluminum-containing stainless steel.

16. The fuel rod cladding of claim 10, wherein said second layer is compatible with fuel pellets held by the fuel rod cladding.

17. The fuel rod cladding of claim 10, wherein said second layer comprises a zirconium alloy.

18. The fuel rod cladding of claim 17, wherein said first layer comprises a zirconium alloy.

19. A fuel rod cladding, comprising:
a triplex cladding consisting essentially of a first layer, a second layer, and a third layer disposed between said first layer and said second layer, wherein said third layer comprises molybdenum having a concentration of 98% or more by weight.

20. The fuel rod cladding of claim 19, wherein said first layer, said second layer, and said third layer comprise a cylindrical shape and form an annulus for receipt of nuclear fuel pellets, wherein said first layer is the outermost layer of said cylindrical shape and said second layer is the innermost layer of said cylindrical shape.

21. The fuel rod cladding of claim 20, wherein said third layer is pure molybdenum.

\* \* \* \* \*